United States Patent Office 2,912,688
Patented Nov. 10, 1959

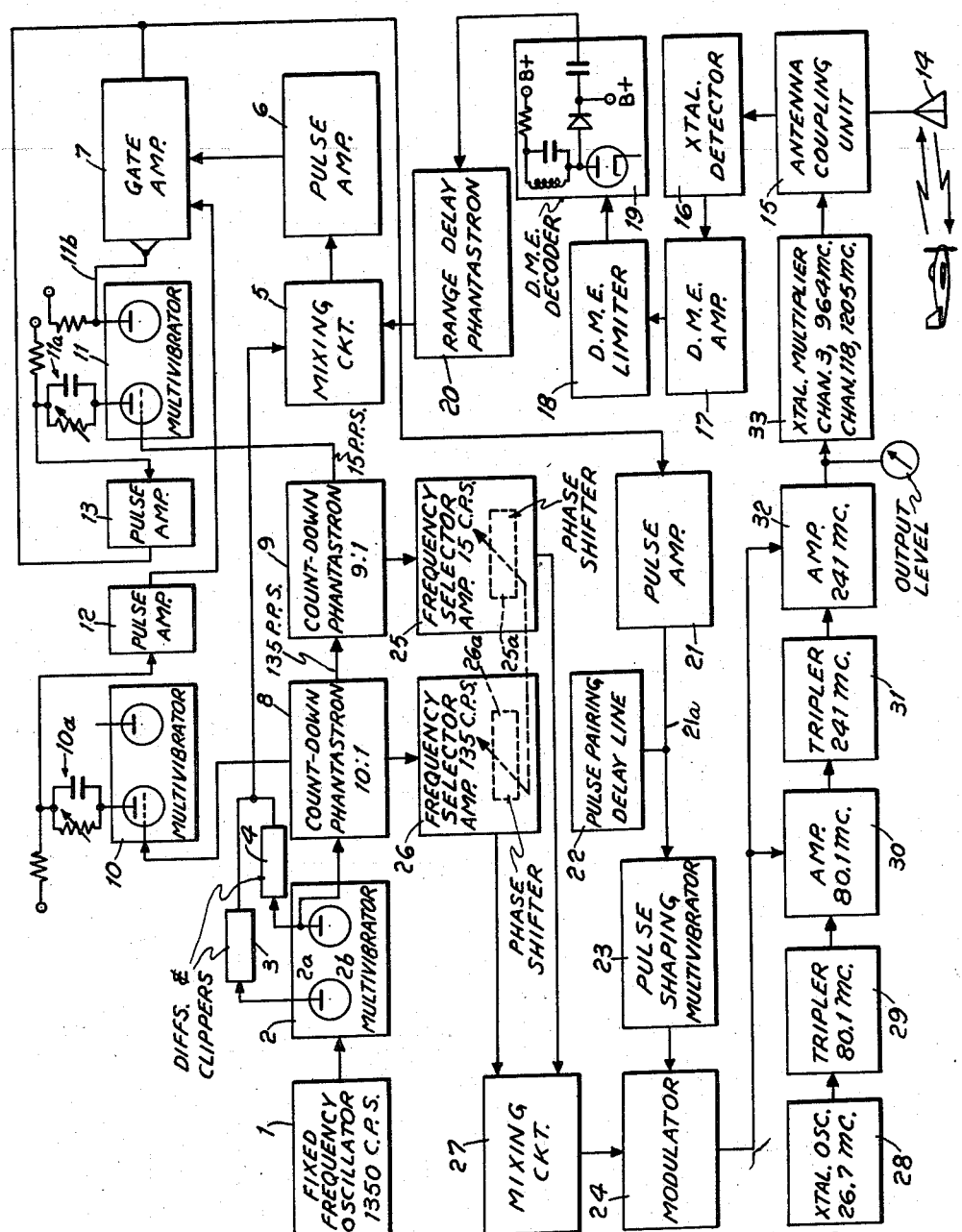

2,912,688

TEST SET

Etienne de Faymoreau, Nutley, Frederick Singer, Jr., Belleville, and Herbert R. Wolter, North Bergen, N.J., assignors to International Telephone and Telegraph Corporation, Nutley, N.J., a corporation of Maryland Application June 18, 1957, Serial No. 666,379

11 Claims. (Cl. 343—106)

The present invention relates to a test set for use in testing radio navigational equipment of a mobile unit and more particularly to a test set for simulating the signal characteristics of a beacon with which said mobile unit is adapted to cooperate.

In certain radio navigation systems, such as TACAN, a beacon station transmits signals such as, for example, pulse signals, according to an asymmetrical rotating radiant action pattern which pulse signals are received on cooperating mobile (airborne) equipment. The beacon transmits several different types of pulse signals which the airborne radio set translates into distance, bearing, and beacon identification information. These pulse signals include semi-random pulses having an average repetition rate, fixed pulses (tone signals) for station identification, specially coded pulse bursts for azimuth reference service, and accurately timed pulse responses to interrogations for distant measurement. The transmitting antenna system at the beacon produces a multi-lobed directional pattern rotating at about 15 cycles per second during which rotation the various pulses of the system are emitted. While in this system reference is made to single pulses, it should be noted that all pulses radiated in this system are actually pairs of pulses with a predetermined spacing between the pulses of the pair to enable distinguishing them from random pulses not belonging to the system. To a receiver receiving these pulses the rotation of the multi-lobed antenna pattern produces an amplitude modulation envelope on the pulses, the phase of which envelope varies at different azimuthal angles from the beacon station. When the major lobe of the directional pattern points in a given direction, such as north, a special signal in the form of a short burst of pulses is transmitted from the beacon, which signal is referred to as the main reference signal. By comparing the phase of the modulation envelope (due to rotation of the beacon pattern) with that of the main reference signal a coarse indication of the bearing of the receiver with respect to the beacon is obtained. If only a main reference signal and a single-lobed directional pattern were used only a relatively coarse indication of bearing would be obtainable. To obtain a finer indication, the directional pattern is multi-lobed with each lobe separated, for example, by 40 degrees from the next, and with auxiliary reference pulse signals in the form of short bursts of pulses being emitted each time one of these other lobes passes the predetermined reference point (for example, the north) as the antenna pattern is rotated. With nine lobes the rotation of this antenna pattern produces a modulation envelope of 135 cycles per second (nine lobes multiplied by 15 cycles) on top of the fundamental of 15 cycles per second due to the main directive lobe. At the receiver the phase of the auxiliary pulse signals with respect to 135 cycles-per-second modulation envelope component is compared and a fine azimuthal indication is thereby obtained.

For distance measurement, distance interrogating pulses are transmitted by the mobile radio set. These interrogations are received by the beacon and corresponding reply pulses are transmitted to the aircraft. Timing circuits automatically measure the round trip travel time, or intervals between interrogation and reply pulse, and convert this into electrical signals to operate the distance meter, thereby indicating to the pilot the distance of his aircraft from the beacon station.

In addition to the reply pulses and bearing reference information, at periodic intervals the radio beacon transmits a 1350 cycle audio signal keyed in International Morse Code by means of which the receiving aircraft is advised which radio beacon it is in communication with. For this purpose, a fixed audio repetition rate series of pairs of pulses (for example, at 1350 pairs per second) is keyed in accordance with a set of letters in Morse code. The aircraft receiver detects these regularly recurring pulse pairs and reproduces the code as a keyed 1350 cycle-per-second audio tone.

From the foregoing it can be seen that due to the nature of the transmission signals, the airborne equipment which receives these signals must be relatively complex. Furthermore it is subject to severe operating conditions, particularly due to accelerations. The maintenance of high accuracy of such a system is of great importance. Therefore, repeated testing of such equipment before each flight is, of course, desirable. For many reasons it is not feasible to use the TACAN beacon to provide the signals needed for preflight test purposes. In the first place, such beacons will not be found near many airports and if adjacent an airport, the beacon signals if received at ground level, will be reflected by numerous site obstructions and unpredictable signal transmission paths. In addition the exact azimuth and distance from the beacon to the airplane must be known. Therefore, the provision of a simple test set which can simulate TACAN beacon signals in order to enable a rapid preflight check on the airborne radio set is extremely important. Such a test set is preferably a light portable device which may be easily handled and carried to the vicinity of the airborne radio set to be tested.

An object of the present invention, therefore, is to provide for a simple test set to simulate beacon signals (for example, TACAN beacon signals) for use in testing airborne navigational equipment.

Another object of the present invention is the provision of a test set adapted to test mobile navigational equipment independently of the equipments position and bearing. Thus, for example, an airplane's navigational equipment may be tested wherever it is located on a field.

Still another object of the present invention is the provision of a test set which can simultaneously service the navigational equipment of a number of mobile units.

A further object of this invention is to provide for such a test set which will produce signals simulating the effect of a rotating radiation pattern, such as found in the TACAN beacon, without actually using an antenna system to produce such a rotating radiation pattern and without even using such a radiation pattern.

A further object is to provide for means in a test set to receive interrogation pulses for the airborne equipment and to transmit corresponding distance reply pulses thereto.

In accordance with a feature of the present invention, pulses simulating beacon pulse signals are generated and electronically modulated to simulate the effect of a rotating antenna pattern.

A further feature of the present invention is the provision of such a test set in which all the pulse signals, as well as the modulations thereof, are all derived from a common timing generator and are positively locked in phase with respect to each other to thereby provide highly accurate and correlated testing pulses; the fixed phase relationship between the modulation and the timing of certain pulse simulating a fixed azimuthal position of the airborne equipment with respect to a rotating beacon. This enables checking of the receiver to see that its azimuthal indication corresponds with this preset phase relationship.

The above mentioned and other features will become apparent and the invention itself will be best understood by reference to the following description taken in conjunction with the accompanying drawings, in which the single figure is a block diagram, partially schematic, of a test set for use in testing the navigational equipment of an aircraft.

Before going into the details of Fig. 1, the particular test set there illustrated in one specific embodiment is adapted to provide the following types of signals:

(1) Identity tone signal pulses consisting of 1350 pairs of pulses per second with a spacing of 100 microseconds between the pulses of a pair.

(2) Main reference pulse signals having a repetition frequency of 15 cycles per second and each consisting of 12 pulses with a spacing of 30 microseconds between successive pulses.

(3) Auxiliary reference pulse signals having a repetition frequency of 135 cycles per second and each consisting of 6 pulses with a spacing of 24 microseconds between successive pulses.

(4) In addition to the foregoing, the test set is adapted to receive interrogating pulses from the airborne equipment and to send reply pulses thereto. A preset fixed delay is added to the interrogating pulses so that the reply pulses simulate a given distance between the test set and the airborne equipment.

All of the pulse signals are interleaved to form a combined pulse train. Since the main reference signals are most important, the system is arranged to block out all other pulses from the combined pulse train which coincide with the main reference signal.

The combined pulse train is next passed to a pulse pairing or coding system which is used to provide for each of the pulses mentioned hereinbefore, a second pulse with a spacing of 12 microseconds between the pulses of the resulting pair. This pairing of all pulses with its unique spacing enables differentiating these pulse pairs from single random noise pulses and is used in the TACAN system.

In addition to generating the foregoing coded combined pulse train, the test set provides for the generation of a complex wave having a fundamental of 15 cycles per second wave and a harmonic of 135 cycles per second. This complex wave is then used to amplitude modulate the combined pulse train. The resulting amplitude modulated pulses are then transmitted to the airborne equipment via an antenna having a fixed (non-rotating) radiation pattern.

Even though a non-rotating antenna system is employed to transmit the pulses from the test set to the airborne equipment being tested, the amplitude modulation components of the amplitude modulated envelope of said pulses contains information which completely simulates that produced by the rotating antenna of TACAN or any similar beacon. The receiver separates the 15 and 135 c.p.s. components and phase compares them with the main and auxiliary reference signals and thereby produces the bearing indication. Since at the test set the phase between the reference signals and these components is preset, the indication produced at the airborne equipment must correspond thereto: this provides a simple means for testing and adjusting the azimuth indicating equipment. The different type of pulses employed also enable testing of the apparatus which they are intended to actuate: the identity tone pulses test the identity tone indicator, and the distance measuring response pulses test the distance indicator. Since the test signal is an R.F. signal consisting of R.F. pulses, this also acts as a test for the R.F. equipment.

Referring now in detail to Fig. 1, a fixed 1350 per second oscillator 1 is used as a timing signal generator for all the test signals except the DME (distance measuring equipment) reply pulses. The identity tone signal pulses are obtained in the following manner. The 1350 cycle per second oscillator 1 is used to trigger a one-shot multivibrator 2 having a 100 microsecond period for a complete cycle. The pulses from both anodes of this multivibrator are differentiated and clipped in differentiators and clippers 3 and 4, respectively so as to provide two pulses of the same polarity and 100 microseconds apart for each cycle of the input frequency to the multivibrator. Thus there is provided the tone pulse signals consisting of pairs of pulses, with the pairs having a repetition frequency of 1350 pairs per second and a pulse spacing in each pair of 100 $\mu$sec. The output pulses of differentiators and clippers 3 and 4 are then fed into mixer 5 and mixed with the DME reply pulses.

The DME reply pulses are originated by the interrogation pulse signals from the mobile radio set to which the test set responds to. The test set picks up the interrogation pulse, detects it and transmits a simulated range reply signal. More specifically this R.F. signal is received by the antenna 14 and fed into an antenna coupling unit 15. From here the signal is fed into a crystal detector 16 and amplified in amplifier 17, passed into a limiter 18 to eliminate the amplitude modulation and make the pulse amplitude uniform, and fed into a DME decoder 19. This DME decoder produces an output pulse in response to every pair of input pulses having the predetermined coded time spacing between pairs such as 12 microseconds in the instant example. The decoder may be of any well-known type, such as a delay line decoder, or a ringing circuit tuned to a frequency having the desired repetition period, followed by a threshold device (a limiter). From here the output pulses are fed into a range delay phantastron 20 where they are delayed by a preset amount to simulate a given distance between the airborne equipment and the test set. The preset fixed delay may be made variable and in one embodiment had two positions providing selection of a simulated range of either 5 or 100 miles. These pulses, which may be called the reply pulses, are then fed into mixer 5 where they are mixed with the identity tone pulses. From here the mixed signal is fed into pulse amplifiers 6 and into the gate amplifier 7.

In addition to the identity tone and DME reply pulse signals; the main (north) reference and auxiliary reference pulse signals are formed in the following manner. The auxiliary reference pulse signals are obtained from one plate of multivibrator 2 providing pulses having a repetition rate of 1350 p.p.s. which trigger a 10:1 countdown pulse divider phantastron 8. The output of this phantastron at 135 p.p.s. triggers a one-shot multivibrator 10. The plate circuit of multivibrator 10 contains a ringing circuit 10a tuned to a frequency of approximately 41.7 kilocycles. In response to each trigger pulse applied to multivibrator 10 the ringing circuit is shock excited and makes a number of complete oscillations. This number is determined by the vibration period of the multivibrator 10 and when the multivibrator 10 returns to its quiescent state further oscillation of ringing circuit 10a halts. In the given example six complete oscillations are produced each having a period of 24 microseconds. These pulses are then clipped, amplified and differentiated in pulse amplifiers 12 to produce six pulses which are fed to the gate amplifier 7. This is the auxiliary reference pulse signal consisting of six pulses spaced at 24 microsecond intervals and repeated at a rate of 135 signals per second.

The main reference pulse signals are formed in the following manner. The output of phantastron 8, consisting of 135 p.p.s., triggers a 9:1 countdown pulse divider phantastron 9, the output of phantastron 9 at 15 p.p.s. triggers a one-shot multivibrator 11. The plate circuit of this multivibrator contains a ringing circuit 11a tuned to a frequency of about 33.3 kilocycles. The period of one-shot multivibrator 11 controls the duration of the effective ringing time so as to obtain the correct number of pulses (12) for the main reference group. That portion of the ringing that occurs during one oscillation of the multivibrator is clipped, amplified, and differentiated in pulse amplifier 13 and fed to the gate amplifier 7. This produces the main reference pulse signals consisting of 12 pulses spaced at 30 microsecond intervals, and repeated at the rate of 15 c.p.s.

Now that the identity tone, the DME reply pulses and the auxiliary reference signals are all formed, they are fed into the gate amplifier 7. This amplifier serves to gate out all signals which are coincident with the main reference signal. This is accomplished by applying a negative gating voltage from the first plate of the multivibrator 11 via line 11b to block the input of the gate amplifier 7 during the time the main reference burst is being produced. At the same time the main reference burst passes on to pulse amplifier 21. In the absence of the main reference signal, the auxiliary reference signals, identity tone signals, and DME reply pulses pass through a gate amplifier 7 and are likewise applied to pulse amplifier 21. At the output of pulse amplifier 21, all the pulses pass along line 21a to a pulse pairing delay line 22 which produces in response to each applied pulse an echo pulse of the same polarity spaced from the initiating pulse by a time delay of 12 microseconds. These are applied with the initiating pulses from amplifier 21 to pulse shaping multivibrator 23 in the form of pulse pairs, with the spacing between the pulses of each pair equal to 12 microseconds. The pulse shaping multivibrator 23 reshapes each incoming pulse so that each is of a standard amplitude and width. From the pulse shaping multivibrator 23 the composite paired pulse train is applied to a modulator 24 in which it is amplitude modulated by a complex wave consisting of a fundamental of 15 cycles per second and a harmonic thereof at 135 cycles per second.

The complex wave is produced in the following manner. The output of phantastron 8 (135 p.p.s.) is fed into a 135 cycle frequency selective amplifier 26, the output phantastron of 9 is fed into a 15 cycle frequency selective amplifier 25, both of these frequency selective amplifiers act to filter out all the harmonic frequencies but the fundamental frequency which for our specific case is 135 cycles and 15 cycles, respectively. The output of the 135 cycles frequency selective amplifier 26 and the output of the 15 cycle frequency selective amplifier 25 are fed into mixer 27 to form a composite signal of 135 cycles per second superimposed on a 15 cycle per second sine wave. This composite signal is fed into modulator 24 and is used to modulate the input video pulse train. Since all the pulse signals (except the DME reply pulses) and the complex wave are derived from (or controlled by), a common timing generator; they are all fixed in phase with respect to each other. To simulate different azimuthal positions, phase shifting networks 25a and 26a in frequency selective amplifiers 25 and 26, respectively, are so adjusted to set the desired phase relationships between the phase of the reference signals and the complex modulated waves.

The modulated video pulse train is used to pulse the R.F. unit. This R.F. unit is composed of a conventional cathode coupled twin triode crystal oscillator operating at a fixed frequency at 26.7 megacycles. This output is fed into a conventional harmonic amplifier or tripler stage 29, the plate circuit tuned to the third harmonic of the crystal frequency or 80.1 megacycles. The signal is then amplified by push-pull amplifier 30. The amplified R.F. signal is then fed into another tripler 31 where the plate circuit is tuned to the third harmonic of the input signal or 241 megacycles. The 241 megacycle R.F. signal is amplified in amplifier 32 and fed into crystal multiplier 33. The multiplier uses the fourth and fifth harmonics to provide an input to the power divider 15 and the antenna 14 on two widely separated frequency channels. The desired test frequency is transmitted at these two frequencies in order that the navigational equipment of the mobile unit may be checked properly at both the low and high band of the operating frequency spectrum. The modulated video output from modulator 24 is used to pulse the grids of amplifier 30, tripler 31 and amplifier 32. Thus, the test set simulates bearing and range signals normally transmitted by the TACAN beacon. The output signal constitutes a pulsed R.F. radio frequency signal with the pulses being amplitude modulated. If the airborne receiver equipment in the mobile unit is operating properly, it will display a predetermined reading on its bearing indicator. Therefore, if the proper range and bearing indications are obtained on both of the transmitting test frequencies, the navigational equipment will check out thoroughly and, in general, should operate properly in actual flight.

While we have described above the principles of our invention in connection with specific apparatus, it is to be clearly understood that this description is made only by way of example and not as a limitation to the scope of our invention as set forth in the objects thereof and in the accompanying claims.

We claim:

1. A test set simulating the signal characteristics of a beacon for testing the equipment of a mobile unit adapted to derive positional information from such a beacon, comprising means for generating a train of pulses, means for generating a wave, a modulator means connected to said generating means for amplitude modulating said pulses with said wave, means for producing reference timing signals of the same periodicity as said wave and of predetermined fixed phase relationship with respect thereto, and means for transmitting said amplitude modulated pulses and said reference signals.

2. A test set according to claim 1, wherein said reference timing signals comprise pulses, means for mixing said reference timing pulses with the pulses of said train, said modulating means amplitude modulating the resultant mixed train.

3. A test set according to claim 2 further including means for receiving pulses from the mobile unit, means for interleaving the received pulses with the locally generated pulses to produce a combined pulse train, said modulating means amplitude modulating the combined pulse train.

4. A test set simulating the signal characteristics of a beacon for testing the equipment of a mobile unit adapted to derive positional information from such a beacon comprising means for generating a train of pulses, means for generating a continuous wave, means for producing reference timing pulse signals of the same periodicity as said wave and having a characteristic distinguishing them from the pulses of said aforementioned train, means for mixing said reference pulses with said train of pulses to produce a combined train of pulses, a modulator means connected to said generating means for amplitude modulating the resultant mixed train of pulses with said wave, and means for transmitting the modulated pulses.

5. A test set according to claim 4, further including a control signal generator, means for coupling said control generator to said reference pulse producing means and said continuous wave generating means for controlling the periodicity of their outputs so that the frequency of said continuous wave and the repetition rate of said reference pulses are harmonically related.

6. A test set according to claim 4, further including means for coupling said control generator to said pulse train generating means for controlling the repetition frequency of the pulses produced thereby so that they are harmonically related to the frequency of said continuous wave.

7. A test set according to claim 4, in which said reference timing pulse signals consist of a group of closely spaced pulses, the duration of each group being less than the period between two successive pulses of said pulse train.

8. A test set simulating the signal characteristics of a beacon for testing the equipment of a mobile unit adapted to derive positional information from such a beacon, comprising means for generating a train of pulses, means for generating a wave at a fundamental frequency, means for generating a second wave harmonically related thereto, means for generating a main reference pulse signal having a repetition frequency of the same periodicity as said fundamental frequency, means for generating auxiliary reference pulse signals having a repetition frequency of the same periodicity as said harmonic wave, said main and auxiliary reference pulse signals having a predetermined fixed phase relationship to said fundamental and harmonic waves respectively, means for combining said pulse train, main reference pulse signals and auxiliary reference pulse signals to produce a combined pulse train, a modulator means coupled to said generating means for amplitude modulating said combined pulse train with said fundamental and harmonic waves, and means for transmitting said amplitude modulated train.

9. A test set according to claim 8 further including means for producing in response to each pulse of said combined train a plurality of pulses spaced according to a predetermined code spacing, said coded pulses producing means being arranged before said modulating means whereby said modulating means amplitude modulates the resultant coded combined pulse train.

10. A test set according to claim 8 wherein said amplitude modulating means comprises means for combining said fundamental and said harmonic waves to produce a complex wave, and modulator means for amplitude modulating said combined train of pulses with said complex wave.

11. A test set according to claim 8, wherein said transmitting means include an antenna for transmitting signals according to a fixed radiation pattern.

References Cited in the file of this patent

UNITED STATES PATENTS

| | | |
|---|---|---|
| 2,717,379 | Earp | Sept. 6, 1955 |
| 2,803,821 | Pickles | Aug. 20, 1957 |
| 2,815,507 | Faymoreau | Dec. 3, 1957 |